B. BROWN.
TONGUE.
APPLICATION FILED NOV. 25, 1911.
1,042,763.
Patented Oct. 29, 1912.
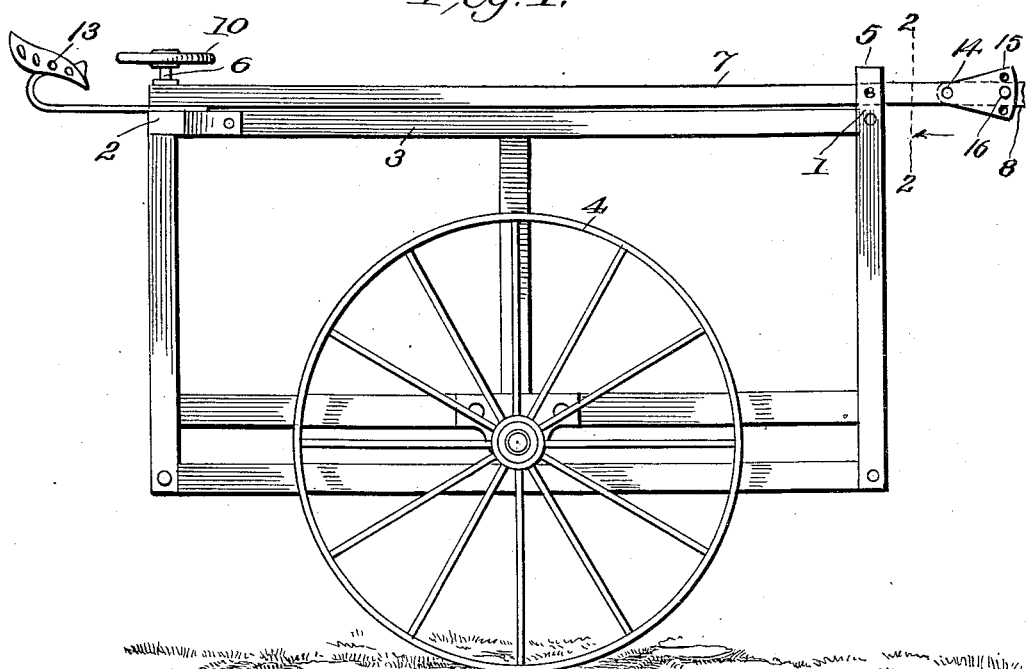
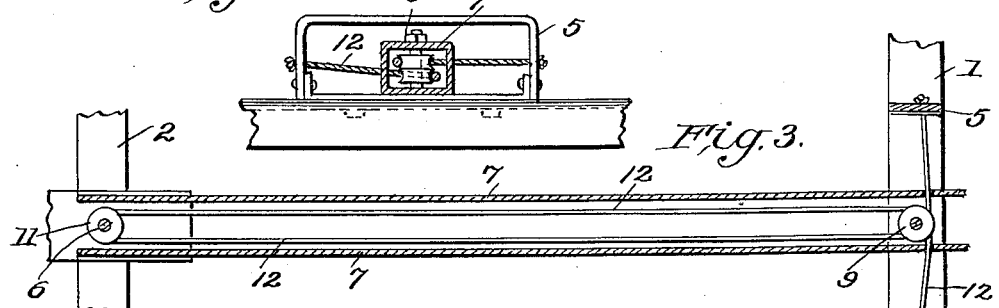
Witnesses
Edward P. Rea.
Juana M. Fallin.
Inventor
Bartley Brown
By A. B. Stacey, Attorney.

UNITED STATES PATENT OFFICE.

BARTLEY BROWN, OF FORT WORTH, TEXAS.

TONGUE.

1,042,763.  Specification of Letters Patent.  Patented Oct. 29, 1912.

Original application filed August 10, 1911, Serial No. 643,330. Divided and this application filed November 25, 1911. Serial No. 662,502.

*To all whom it may concern:*

Be it known that I, BARTLEY BROWN, citizen of the United States, residing at Fort Worth, in the county of Tarrant and State of Texas, have invented certain new and useful Improvements in Tongues, of which the following is a specification.

This invention has relation to tongues, especially adapted to be applied to agricultural machines, as for instance wheel mounted plow frames, and has for its object the provision of a tongue structure with means for connecting the same to the frame of the machine so that the frame may be swung under the tongue laterally while the frame is being moved over the ground. Means is also provided for raising and lowering the forward portion of the tongue with relation to the rear portion thereof and for securing the same in an adjusted position.

Further objects and advantages will appear in the following description, it being understood that various changes in form, proportions and minor details of construction may be resorted to within the scope of the appended claims.

For a full understanding of the invention reference is to be had to the following description and accompanying drawing, in which:

Figure 1 is a side elevation of the rear portion of the tongue, showing the same applied to a plow frame; Fig. 2 is a transverse sectional view of a tongue cut on the line 2—2 of Fig. 1; Fig. 3 is a horizontal sectional view of the rear portion of the tongue; and Fig. 4 is a vertical longitudinal sectional view of the rear portion of the tongue.

Corresponding and like parts are referred to in the following description and indicated in all the views of the accompanying drawing by the same reference characters.

As illustrated in the accompanying drawing, the tongue is shown applied to the upper portion of a plow frame of which the cross bar 1 is located in front and the cross bar 2 at the rear thereof. These bars are connected together by side bars 3 and other suitable bars, if desired. This frame is supported upon wheels, indicated at 4.

A yoke 5 is mounted upon the upper side of the cross bar 1 and a shaft 6 is journaled upon the cross bar 2. A sleeve 7 is pivotally mounted at its rear end upon the shaft 6 and its forward portion lies between the intermediate portion of the yoke 5 and the top of the bar 1. A tongue 8 is inserted in the forward end of the sleeve 7. Pulleys 9 are journaled in the sleeve 7 at or about the bar 1 and the yoke 5. A hand wheel 10 is fixed to the upper end of the shaft 6, and a drum 11 is fixed to the shaft 6 and is located within the sleeve 7. A cable 12 is attached at one end to one end of the yoke 5 from whence it passes through the side of the sleeve 7 and around one of the pulleys 9, thence back to the drum 11 and around the same, thence forward and around the other pulley 9, thence out at the side of the sleeve 7 and is attached at its outer end to the other side of the yoke 5.

Therefore it will be seen that by turning the hand wheel 10 and rotating the shaft 6 that said cable will be moved longitudinally by the drum 11 and inasmuch as the ends of the cable are fixed to the yoke 5 which in turn is fixed to the bar 1 the forward portion of the frame will be swung horizontally under the sleeve 7 and thus means is provided for adjusting the frame at a desired angle with relation to the sleeve and the tongue, whereby the line of draft of the frame may be varied.

A seat post and seat, indicated at 13, is carried upon the cross bar 2 and the hand wheel 10 is within reach of one occupying the said seat. The rear end of the tongue is mounted upon a pivot bolt 14 which passes through the sides of the sleeve 7 and the forward end of the said sleeve is flared vertically. The sleeve is provided at its forward end and at its opposite sides with perforations 15 arranged in rows, and a securing bolt 16 is adapted to be passed through the alined perforations 15 at the opposite sides of the sleeve and also through the tongue 8 so that the said tongue may be secured at a desired angle with relation to the sleeve 7.

The subject matter of this invention is divided from my prior application for patent for plow frame, filed August 10, 1911, Serial Number 643,330.

Having thus described the invention, what is claimed as new is:

1. In combination with a frame, a yoke mounted thereon, a shaft journaled thereon, a sleeve pivoted upon the shaft and passing through the yoke, pulleys journaled within the sleeve under the yoke, a drum mounted upon the shaft, and a cable trained around the pulleys and the drum and at its end portions passing out through the sleeve and secured to the opposite ends of the yoke.

2. In combination with a frame, a yoke mounted thereon, a shaft journaled thereon, a hand wheel mounted at the upper end of the shaft, a sleeve pivoted upon the shaft and passing through the yoke, pulleys journaled in the sleeve, a drum located upon the shaft within the sleeve, and a cable trained around the pulleys and the drum and passing out through the opposite sides of the sleeve and secured at its ends to the opposite ends of the yoke.

3. In combination with a frame, a yoke mounted upon the forward portion thereof, a shaft journaled upon the rear portion thereof in a vertical plane approximately midway between the ends of the yoke, a sleeve pivoted upon the shaft and passing through the yoke, a tongue section adjustably mounted in the sleeve, a drum mounted upon the shaft within the sleeve, pulleys journaled within the sleeve under the yoke, and a cable trained around the pulleys and the drum and passing through the opposite sides of the sleeve and secured at its ends to the opposite ends of the yoke.

In testimony whereof I affix my signature in presence of two witnesses.

BARTLEY BROWN. [L. S.]

Witnesses:
   J. W. McDONALD,
   L. MADDOX.

---

Copies of this patent may be obtained for five cents each, by addressing the "Commissioner of Patents, Washington, D. C."